United States Patent [19]

Dominguez et al.

[11] 4,444,703

[45] Apr. 24, 1984

[54] REINFORCED REACTION INJECTION MOLDED ELASTOMERS

[75] Inventors: Richard J. G. Dominguez; Doris M. Rice, both of Austin, Tex.

[73] Assignee: Texaco Inc., White Plains, N.Y.

[21] Appl. No.: 355,939

[22] Filed: Mar. 8, 1982

Related U.S. Application Data

[63] Continuation-in-part of Ser. No. 185,826, Sep. 10, 1980, abandoned.

[51] Int. Cl.³ .............................................. B29D 27/00
[52] U.S. Cl. .................................. 264/45.3; 264/45.5; 264/53; 264/328.6; 264/328.18
[58] Field of Search ............... 264/45.3, 45.5, 328.6, 264/DIG. 83, 51, 53, 54, 328.18

[56] References Cited

U.S. PATENT DOCUMENTS

| | | | |
|---|---|---|---|
| 2,683,730 | 7/1954 | Seeger et al. | 564/331 X |
| 2,950,263 | 8/1960 | Abbotson et al. | |
| 3,012,008 | 12/1961 | Lister . | |
| 3,194,773 | 7/1965 | Hostettler . | |
| 3,344,162 | 9/1967 | Rowton | 564/315 X |
| 3,362,979 | 1/1968 | Bentley . | |
| 4,073,840 | 2/1978 | Saidla | 264/45.3 |
| 4,190,711 | 2/1980 | Zdrahala et al. | 264/328.6 X |
| 4,218,543 | 8/1980 | Weber et al. | 264/DIG. 83 |
| 4,242,306 | 12/1980 | Kreuer et al. | 264/45.3 X |
| 4,254,069 | 3/1981 | Dominguez et al. | 264/DIG. 83 |

FOREIGN PATENT DOCUMENTS 2035111 6/1980 United Kingdom ............. 264/328.6

*Primary Examiner*—Philip E. Anderson
*Attorney, Agent, or Firm*—Jack H. Park; Kenneth R. Priem; David L. Mossman

[57] ABSTRACT

A method of improving the physical properties of high density reinforced reaction injection molded microcellular or solid elastomers is disclosed. The method involves placing an inert filler material wholly in the isocyanate component of a two component reaction system where the other component contains predominantly polyol before mixing the components to effect reaction. This modification will result in an improvement in tensile strength and thermal dimensional stability when compared to placing the inert filler material in the polyol component before reaction.

21 Claims, No Drawings

REINFORCED REACTION INJECTION MOLDED ELASTOMERS

This application is a continuation-in-part of application Ser. No. 185,826 filed Sept. 10, 1980 and now abandoned.

BACKGROUND OF THE INVENTION

1. Field of the Invention

The invention concerns the field of high density reinforced reaction injection molded polyurethanes (RRIM), specifically microcellular or solid elastomers.

2. Description of the Prior Art

Reaction Injection Molding (RIM) is a technique for the rapid mixing and molding of large, fast curing urethane parts. High density RIM polyurethane parts are used in a variety of exterior body applications on automobiles where their light weight contributes to energy conservation. High density RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. The low molecular weight active hydrogen containing compounds are ethylene glycol, 1,4-butane diol or similar materials known to those skilled in the art.

Generally, the active hydrogen containing materials, both high and low molecular weight, are mixed together with catalyst and other optional materials in one tank and the polyisocyanate is contained in another tank. When these two streams are brought together in a mold, reaction is effected, and the RIM part is made. In many cases, in order to improve the strength properties of the RIM product, a reinforcing material such as chopped or milled glass or other mineral fibers is incorporated into the RIM formulation by placing the inert filler material in the unreacted components. Prior to our invention, the filler material for high density microcellular or solid RRIM urethanes has been placed in the active hydrogen containing material side, that is, the polyol side or split between the polyol side and the polyisocyanate side before the polyol and the isocyanate streams are mixed together.

Saidla's U.S. Pat. No. 4,073,840 discloses the placing of fibrous materials in polyurethane compositions with the placement of the fibrous material being optional between the isocyanate component and the polyol component. An example is given wherein the fibrous material is placed in the isocyanate component but with the proviso that the fibers could be alternatively added totally or partially to the second (polyol) component of the resin. Saidla is a broad disclosure which allegedly applies the concept of fiber placement in foamable compositions to many types of foams, including polyurethanes, epoxies and others. At column 6 of Saidla, beginning at about line 35, the preferred type of fiber reinforced material appears to be "reinforced structural foams." These are described as thick structural foam boards with thicknesses up to 3 inches. These appear to be rigid type polyurethane foams. At column 7 of Saidla, Table 1 describes foam materials which are 3×4" panels one inch thick, ranging in density from 21 to 43 pounds per cubic foot. Although it is not stated as such, these materials also appear to be rigid polyurethane foams. Also, at column 7 of Saidla, beginning at about line 33, low density foams containing fiber loadings are described wherein the core ranges from about 1 to 3 pounds per cubic foot and the skin ranges from about 30 to 60 pounds per cubic foot. Also, Saidla describes his materials as having a low density core and a high density integral skin. Indeed, the description at column 7, beginning at line 33, describes a foam with a skin density of at least ten times the core density and as much as 60 times the core density.

U.K. patent application No. 2,035,111 discloses a reaction injection molding process wherein glass fibers are incorporated into the raw materials before forming the part. This publication acknowledges the Saidla patent referred to above and states at page 1, line 100, that Saidla teaches placing the glass fibers into one or more of the resin components. The U.K. patent application discloses its invention at page 3, beginning at about line 71. According to the disclosure, the normal components A and B are supplemented by a separate auxiliary component system which contains the glass fiber filler material. At page 4, beginning at line 13, the U.K. patent application states that it is preferred to slurry the fiber in a separate portion of the polyol component.

It has been surprisingly discovered that properties are considerably improved if all of the inert filler material is placed in the isocyanate side prior to reaction for a high density microcellular or solid RRIM urethane.

SUMMARY OF THE INVENTION

The invention is a method of improving certain physical properties of inert fiber reinforced reaction injection molded microcellular or solid polyurethane elastomers (RRIM) of at least about 53 pounds per cubic foot average density if microcellular and 70 pounds per cubic foot if solid made by the reaction of two streams, one containing polyisocyanate and one containing active hydrogen containing materials. The method involves placing all of the inert filler material in the isocyanate containing stream prior to mixing and reaction with the active hydrogen containing stream and then reacting the streams in a conventional manner.

DESCRIPTION OF THE PREFERRED EMBODIMENTS

The RIM elastomer of this invention may be microcellular or solid and range from about 0.05 to 0.25 inches in thickness. To form a microcellular RIM elastomer, a minor amount of a blowing agent to be discussed below is used to form microcells in the interior portion of the RIM part. In the preferred procedure, the microcellular RIM part is between about 0.1 and 0.15 inches thick and about one-third of the part at its center portion has microcells and the outer portions comprise about one-third on each side of the center part, or about two-thirds of the total RIM part is essentially a solid although some microcells are present, diminishing in numbers as the skin is approached. If a solid RIM elastomer is desired, no additional blowing agent is added to the formulation. The densities of the RIM parts suitable in the process of the invention average from about 53 to 97 pounds per cubic foot. Thus, the core containing the microcells may range from about 30 to 90 pounds per cubic foot and the outer portion comprising two-thirds of the RIM part would range from about 65 to 100 pounds per cubic foot. If a solid RIM elastomer is desired, no blowing agent is added and the RIM part density ranges from about 70 to 100 pounds per cubic foot.

The polyols useful in the RIM elastomers of this invention include polyether polyols, polyester diols, triols, tetrols, etc., having an equivalent weight of from about 1,000 to about 3,000. Those polyether polyols based on trihydric initiators which have hydroxyl numbers ranging from about 56 to about 24 are especially preferred. The polyethers may be prepared from lower alkylene oxides such as ethylene oxide, propylene oxide, butylene oxide or mixtures of propylene, butylene and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application.

The chain-extenders useful in the process of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

A wide variety of aromatic polyisocyanates may be used here. Typical aromatic polyisocyanates include p-phenylene diisocyanate, polymethylene polyphenyl-isocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

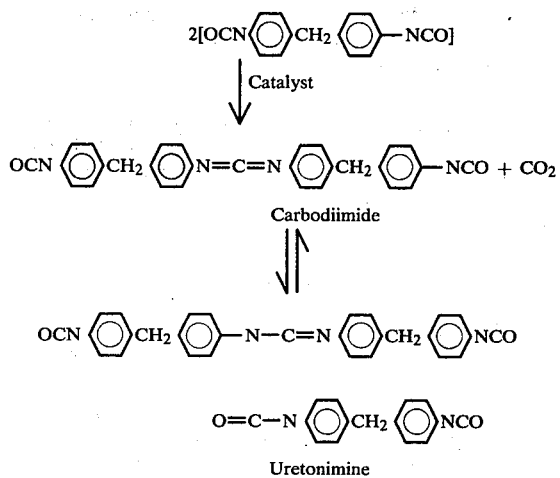

Examples of commercial materials of this type are Upjohn's ISONATE=125M (pure MDI) and ISONATE=143L ("liquid" MDI). Preferably the amount of isocyanates used is the stoichiometric amount based on all the ingredients in the formulation or greater than the stoichiometric amount.

In one embodiment of the invention, the polyisocyanate not prereacted with any active hydrogen containing compounds such as polyols before the polyisocyanate stream and polyol streams are mixed to form the RRIM part.

In another embodiment, the polyisocyanate stream may comprise a quasi-prepolymer. A quasi-prepolymer is the reaction product of a polyol with more than the stoichiometric amount of polyisocyanate.

Catalysts can be present to accelerate the reaction. Among those most frequently employed in this art are the amine catalysts and the organo methallic compounds. For example, trimethylamine, N-methylmorpholine, N,N,N',N'-tetramethyl-1,3-butanediamine, 1,4-diazabicyclo-!2.2.1!octane, dibutyltin dilaurate, stannous octoate, dioctyltin diacetate, lead octoate, lead naphthenate, lead oleate, etc. Also useful are other known catalysts such as the tertiary phosphines, the alkali and alkaline earth metal hydroxides or alkoxides, the acidic metal salts of strong acids, salts of various metals, etc. These catalysts are well known in the art and are employed in catalytic quantities, for example, from 0.001 percent to about 5 percent, based on the weight of the reaction mixture.

The RIM formulation may contain a great number of other recognized ingredients such as additional crosslinkers, catalysts, extenders and the like.

If a microcellular RIM part as discussed above is desired, then a minor amount of a blowing agent may be added to the formulation. By minor amount, we mean an amount ranging from about 0.05 to about 5% by weight based on the total formulation. Blowing agents may include halogenated low-boiling hydrocarbons, such as trichloromonofluoromethane and methylene chloride, carbon dioxide, nitrogen, etc., used.

When no blowing agent is added, the RIM part is essentially a solid. However, minute amounts of water or gases may be present in the raw materials. Therefore, some microcells, though relatively few in number, may be present in a solid RIM part.

Other conventional formulation ingredients may also be employed, such as, for example, foam stabilizers, also known as silicone oils or emulsifiers. The foam stabilizer may be an organic silane or siloxane. For example, compounds may be used having the formula:

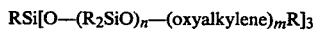

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

The reinforcing materials useful in the practice of our invention are those which are useful and known to those skilled in the art. For example, chopped or milled glass fibers, chopped or milled carbon fibers and/or other mineral fibers are useful. The invention herein lies not in which inert fiber is useful but in the method of its incorporation in the reaction medium. That is, invention concerns placing all of the inert fibers or fillers in the isocyanate portion prior to reaction with the active hydrogen containing portion.

In a particularly preferred embodiment, a 5500 molecular weight polyether polyol based on a trihydric initiator (hydroxyl number of about 33), ethylene glycol, silicone fluid and catalysts are mixed and comprise the polyol stream. The polyisoccyanate stream comprises a quasiprepolymer of the 5500 molecular weight polyol described above and liquid MDI. Glass fibers are placed in the polyisocyanate stream. The polyol stream and the polyisocyanate stream are mixed and reacted in a RRIM machine resulting in a RRIM elastomer which is cured at 250° F. for about 30 minutes.

The examples which follow exemplify the improvement obtained by the process of the invention. However, these examples are not intended to limit the scope of the invention.

GLOSSARY OF TERMS AND MATERIALS

Thanol ® SF-5505—a 5500 molecular weight polyether triol containing approximately 80% primary hydroxyl groups.

L5430 Silicone Oil—a silicone glycol copolymer surfactant containing reactive hydroxyl groups. Product of Union Carbide.

THANCAT ® DMDEE—Dimorpholinodiethylether

FOMREZ ® UL-29—a stannic diester of a thiol acid. The exact composition is unknown. Product of Witco Chemical Co.

ISONATE ® 143L—pure MDI isocyanate modified so that it is a liquid at temperatures where MDI crystallizes—product of the Upjohn Co.

Quasi-prepolymer L-55-0—A quasi-prepolymer formed by reacting weights of Isonate 143L and THANOL SF-5505.

EXAMPLE I

THANOL SF-5505 (16.0 pbw.), ethylene glycol (6.44 pbw) L-5430 silicone fluid (0.20 pbw.), THANCAT DMDEE (0.25 pbw.), FOMREZ UL-29 (0.025 pbw.), and dibutyltin dilaurate (0.015 pbw.) were premixed and charged into the polyol component working tank of an Accuratio VR-100 RRIM machine. ISONATE 143L (29.66 pbw.), L 55-0 quasi-prepolymer (5.75 pbw.) and Owens/Corning Fiberglas P 117B 1/16" milled glass fiber (14.6 pbw.) were premixed and charged into the isocyanate component working tank of the machine. The amount of glass dispersed in the isocyanate component represented 20 percent of the resulting elastomer. The isocyanate component was adjusted to 90° F. and the polyol component adjusted to 120° F. The machine was adjusted so that the isocyanate/polyol ratio was 2.18 by weight at a total throughput of 60 lb./min.

At the above conditions, the components were injected through the impingement mix head into an 18"×18"×0.125" steel mold preheated to 160° F. The parts were released in one minute. Some of the samples received no post cure while others were post cured 30 minutes at 250° F. and still others at 325° F. The dimension of the parts post treated under the three conditions were accurately measured and compared to the dimensions of the mold. Then, after conditioning for one week, mechanical properties were obtained both parallel and perpendicular to the flow of glass fiber filled components into the mold.

EXAMPLE II

The formulation of Example I was repeated except that in this case, 20 percent by weight OCF P117B 1/16" milled glass was added to each component (5.73 pbw in the polyol component and 8.85 pbw. in the isocyanate component). The filled plaques were molded under exactly the same conditions as in Example I except that in this case, the weight ratio of the isocyanate/polyol component was 1.544. These were cured and tested according to the conditions outlined in Example I.

EXAMPLE III

The formulation of Example I was repeated, except that in this case, all the milled glass fiber (14.6 pbw) was dispersed in the polyol component. The filled plaques were molded under exactly the same conditions as Example I except that in this case, the weight ratio of the isocyanate/polyol components was 0.944. These were cured and tested according to the conditions outlined in Example I.

Thus, the composition of the three elastomers described in Examples I, II and III is exactly the same. The only difference among them is in which component or components the glass was dispersed before reaction.

Table I gives the properties of the three elastomers. Note that all properties are best for the elastomer of Example I where all the glass is dispersed in the Isocyanate component. In particular, tensile strength is improved by the practice of this invention. In Table II, the shrinkage/expansion properties of the three elastomers as shown as a function of annealing temperature. Note that the elastomer of Example I is least affected by temperature. Example III, where all the glass is dispersed in the polyol component, displays the greatest sensitivity to temperature. In fact, when this elastomer is annealed at 325° F. for ½ hour (Table II), it actually expands versus the mold size. Since it is very desirable, that RRIM elastomers be insensitive to temperature changes, it is clear that the elastomer of Example I is the best.

TABLE I

Properties as a Function of the Distribution of Glass in the Polyol and Isocyanate Liquid Components

| Flow Direction | Example I* | | Example II* | | Example III* | |
|---|---|---|---|---|---|---|
| | Parallel | Perpendicular | Parallel | Perpendicular | Parallel | Perpendicular |
| Tensile strength, psi | 5100 | 4500 | 4500 | 4400 | 4050 | 3800 |
| Elongation, % | 42 | 48 | 28 | 64 | 30 | 65 |
| Flexural Modulus, psi at 77° F. | 245000 | 155000 | 235000 | 150000 | 230000 | 150000 |
| Heat Sag., in. 6" overhang ½ hr. at 325° F. | 0.22 | 0.31 | 0.24 | 0.54 | 0.39 | 0.36 |

*Isocyanate Index = 1.02, all parts annealed ½ hr. at 325° F.

TABLE II

Shrinkage/Expansion* as a Function of the Distribution of Glass in the Polyol and Isocyanate Components

| Annealing Condition | Example I | Example II | Example III |
|---|---|---|---|
| No annealing | −0.35 | −0.35 | −0.35 |
| Annealed ½ hr. at 250° F. | −0.57 | −0.57 | −0.35 |
| Annealed ½ hr. at 325° F. | −0.24 | −0.13 | +0.31 |

*Shrinkage is reported as a negative (−) % and expansion is represented as a positive (+) % versus cold steel mold dimensions. Data is reported in the direction perpendicular to the flow direction since this is where differences are most exaggerated.

We claim:

1. In a method for making inert filler reinforced reaction injection molded polyurethane elastomers of at least 53 pounds per cubic foot average density and ranging from about 0.05 to 0.25 inches in thickness wherein two streams are reacted with one another, one stream containing polyisocyanate and the other stream containing active hydrogen containing materials, the improvement which comprises placing all of an inert filler material in the isocyanate containing stream prior to mixing and reaction with the active hydrogen containing stream.

2. The method of claim 1 wherein the active hydrogen containing materials are polyols.

3. The method of claim 1 wherein the polyols are polyether polyols based on trihydric initiators having hydroxyl numbers ranging from about 56 to about 24.

4. The method of claim 1 wherein the polyisocyanate is methylene bis(4-phenylisocyanate).

5. The method of claim 1 wherein the inert filler material comprises glass.

6. In a method for making glass fiber reinforced reaction injection molded polyurethane elastomers of at least 53 pounds per cubic foot average density and ranging from about 0.05 to 0.25 inches in thickness wherein a polyether polyol containing stream is reacted with a methylene bis(4-phenylisocyanate) containing stream, the improvement which comprises placing all of the glass fiber in the methylene bis(4-phenylisocyanate) containing stream prior to reaction with the polyether polyol containing stream.

7. The method of claim 6 wherein the polyol is about 5500 molecular weight and based on a trihydric initiator.

8. In a method for making inert filler reinforced reaction injection molded microcellular polyurethane elastomers of from about 53 to 97 pounds per cubic foot average density and ranging from about 0.05 to 0.25 inches in thickness wherein two streams are reacted with one another, one stream containing polyisocyanate and the other stream containing active hydrogen containing materials and a minor amount of a blowing agent, the improvement which comprises placing all of an inert filler material in the isocyanate containing stream prior to mixing and reaction with the active hydrogen containing stream.

9. The method of claim 8 wherein the active hydrogen containing materials are polyols.

10. The method of claim 8 wherein the polyols are polyether polyols based on trihydric initiators having hydroxyl numbers ranging from about 56 to about 24.

11. The method of claim 8 wherein the polyisocyanate is methylene bis(4-phenylisocyanate).

12. The method of claim 8 wherein the inert filler material comprises glass.

13. In a method for making glass fiber reinforced reaction injection molded microcellular polyurethane elastomers of from about 53 to 97 pounds per cubic foot average density and ranging from about 0.05 to 0.25 inches in thickness wherein a polyether polyol containing stream also containing a minor amount of a blowing agent is reacted with a methylene bis(4-phenyl isocyanate) containing stream, the improvement which comprises placing all of the glass fiber in the methylene bis(4-phenylisocyanate) containing stream prior to reaction with the polyether polyol containing stream.

14. The method of claim 13 wherein the polyol is about 5500 molecular weight and based on a trihydric initiator.

15. In a method for making inert filler reinforced reaction injection molded solid polyurethane elastomers of from about 70 to 100 pounds per cubic foot density and ranging from about 0.05 to 0.25 inches in thickness wherein two streams are reacted with one another, one stream containing polyisocyanate and the other stream containing active hydrogen containing materials, the improvement which comprises placing all of an inert filler material in the isocyanate containing stream prior to mixing and reaction with the active hydrogen containing stream.

16. The method of claim 15 wherein the active hydrogen containing materials are polyols.

17. The method of claim 15 wherein the polyols are polyether polyols based on trihydric initiators having hydroxyl numbers ranging from about 56 to 24.

18. The method of claim 15 wherein the polyisocyanate is methylene bis(4-phenylisocyanate).

19. The method of claim 15 wherein the inert filler material comprises glass.

20. In a method for making glass fiber reinforced reaction injection molded solid polyurethane elastomers of from about 70 to 100 pounds per cubic foot density and ranging from about 0.05 to 0.25 inches in thickness wherein a polyether polyol containing stream is reacted with a methylene bis(4-phenylisocyanate) containing stream, the improvement which comprises placing all of the glass fiber in the methylene bis(4-phenylisocyanate) containing stream prior to reaction with the polyether polyol containing stream.

21. The method of claim 20 wherein the polyol is about 5500 molecular weight and based on a trihydric initiator.

* * * * *

Disclaimer 4,444,703.—*Richard J. G. Dominguez* and *Doris M. Rice,* Austin, Tex. REINFORCED REACTION INJECTION MOLDED ELASTOMERS. Patent dated Apr. 24, 1984. Disclaimer filed Feb. 1, 1985, by the assignee, *Texaco, Inc.*

Hereby enters this disclaimer to claims 1 through 21 of said patent.
[*Official Gazette April 9, 1985.*]